(12) United States Patent
Khlat et al.

(10) Patent No.: US 10,547,336 B2
(45) Date of Patent: Jan. 28, 2020

(54) RADIO FREQUENCY CIRCUITRY FOR CARRIER AGGREGATION

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/332,676

(22) Filed: Oct. 24, 2016

(65) Prior Publication Data

US 2017/0117933 A1 Apr. 27, 2017

Related U.S. Application Data

(60) Provisional application No. 62/245,317, filed on Oct. 23, 2015.

(51) Int. Cl.
*H04B 1/00* (2006.01)
*H04B 1/38* (2015.01)
*H04B 1/48* (2006.01)

(52) U.S. Cl.
CPC ......... *H04B 1/0064* (2013.01); *H04B 1/0057* (2013.01)

(58) Field of Classification Search
CPC .. H04B 1/48; H04B 1/0064; H04B 2001/485; H04B 1/0475; H04B 1/38; H04J 11/0063; H03H 9/0004; H03H 9/706; H03H 9/70; H03H 19/008
See application file for complete search history.

(56) References Cited

U.S. PATENT DOCUMENTS

| | | | |
|---|---|---|---|
| 6,185,182 B1 | 2/2001 | Meredith et al. | |
| 6,766,262 B2 | 7/2004 | Martens | |
| 7,295,814 B2* | 11/2007 | Yamashita | H04B 1/0057 333/132 |
| 7,471,930 B2* | 12/2008 | Okuyama | H04B 1/44 455/78 |
| 7,501,912 B2* | 3/2009 | Jamneala | H03H 9/0004 333/132 |
| 7,512,388 B2* | 3/2009 | Snider | H04B 1/0057 455/101 |
| 7,596,357 B2* | 9/2009 | Nakamata | H04B 1/0057 455/78 |
| 7,711,389 B2* | 5/2010 | Furutani | H04B 1/005 333/103 |

(Continued)

OTHER PUBLICATIONS

Non-Final Office Action for U.S. Appl. No. 15/696,241, dated Nov. 29, 2018, 15 pages.

(Continued)

*Primary Examiner* — Pablo N Tran
(74) *Attorney, Agent, or Firm* — Withrow & Terranova, P.L.L.C.

(57) ABSTRACT

Radio frequency (RF) circuitry is configured to separately route RF transmit signals in different RF frequency bands through one or more non-linear elements, such as switches, in order to avoid intermodulation of the RF transmit signals. One or more filters may be arranged to provide different switching paths in RF front end circuitry to ensure that RF transmit signals are not routed together through a non-linear element, thereby improving the performance of the circuitry.

17 Claims, 8 Drawing Sheets

(56) References Cited

U.S. PATENT DOCUMENTS

| | | | | |
|---|---|---|---|---|
| 7,872,547 B2* | 1/2011 | Song | | H01Q 21/28 |
| | | | | 333/101 |
| 7,885,613 B2* | 2/2011 | Kemmochi | | H04B 1/006 |
| | | | | 455/78 |
| 8,558,641 B2* | 10/2013 | Murase | | H01P 1/213 |
| | | | | 333/126 |
| 8,582,547 B2* | 11/2013 | Kemmochi | | H03H 7/09 |
| | | | | 370/343 |
| 8,680,944 B2* | 3/2014 | Ye | | H03H 9/0571 |
| | | | | 333/133 |
| 8,706,056 B2* | 4/2014 | Saji | | H04B 1/525 |
| | | | | 455/307 |
| 8,918,063 B2* | 12/2014 | Song | | H04B 1/006 |
| | | | | 333/189 |
| 9,124,355 B2* | 9/2015 | Black | | H04B 1/525 |
| 9,263,793 B2* | 2/2016 | Dupuy | | H01Q 1/50 |
| 9,853,683 B2* | 12/2017 | Khlat | | H04B 1/44 |
| 2001/0021644 A1 | 9/2001 | Jang | | |
| 2002/0183016 A1* | 12/2002 | Kemmochi | | H01P 1/15 |
| | | | | 455/83 |
| 2004/0102172 A1* | 5/2004 | Hendin | | H04B 1/005 |
| | | | | 455/302 |
| 2007/0075803 A1* | 4/2007 | Kemmochi | | H04B 1/0057 |
| | | | | 333/132 |
| 2007/0105519 A1 | 5/2007 | Perkins | | |
| 2007/0229189 A1* | 10/2007 | Iwata | | H03H 7/463 |
| | | | | 333/133 |
| 2008/0231387 A1* | 9/2008 | Nagai | | H01P 1/047 |
| | | | | 333/5 |
| 2012/0238230 A1 | 9/2012 | Tombak et al. | | |
| 2013/0154868 A1 | 6/2013 | Kehrer et al. | | |
| 2014/0011463 A1 | 1/2014 | Madan et al. | | |
| 2014/0327578 A1 | 11/2014 | Rowson et al. | | |
| 2014/0376534 A1 | 12/2014 | Pajona et al. | | |
| 2015/0065124 A1 | 3/2015 | Kim | | |
| 2015/0223083 A1 | 8/2015 | Maca et al. | | |
| 2015/0295559 A1* | 10/2015 | White | | H03H 9/706 |
| | | | | 455/78 |
| 2017/0047949 A1 | 2/2017 | Notargiacomo | | |
| 2017/0070405 A1* | 3/2017 | Hashemi | | H04L 43/028 |
| 2017/0125892 A1 | 5/2017 | Arbabian et al. | | |
| 2018/0024175 A1 | 1/2018 | Quan | | |
| 2018/0048294 A1 | 2/2018 | Gathman et al. | | |
| 2018/0091186 A1 | 3/2018 | Lim et al. | | |
| 2018/0248627 A1 | 8/2018 | Daniel et al. | | |

OTHER PUBLICATIONS

Final Office Action for U.S. Appl. No. 15/696,241, dated Jul. 17, 2019, 15 pages.

Notice of Allowance for U.S. Appl. No. 15/696,241, dated Oct. 3, 2019, 8 pages.

* cited by examiner

RADIO FREQUENCY CIRCUITRY FOR CARRIER AGGREGATION

RELATED APPLICATIONS

This application claims the benefit of provisional patent application Ser. No. 62/245,317, filed Oct. 23, 2015, the disclosure of which is hereby incorporated herein by reference in its entirety.

FIELD OF THE DISCLOSURE

The present disclosure relates to radio frequency (RF) circuitry suitable for carrier aggregation, and specifically to RF circuitry configured to reduce intermodulation products produced during uplink carrier aggregation.

BACKGROUND

Carrier aggregation, in which a wireless communications device simultaneously transmits and/or receives radio frequency (RF) signals over multiple RF frequency bands, has become increasingly popular in order to maximize data throughput. Supporting carrier aggregation in a wireless communications device presents several challenges in the design and manufacture of the device. FIG. 1 is a functional schematic of conventional radio frequency (RF) front end circuitry 10 suitable for performing both uplink carrier aggregation in which multiple RF transmit signals in different operating bands are simultaneously transmitted and downlink carrier aggregation in which multiple RF receive signals in different operating bands are simultaneously received. The conventional RF front end circuitry 10 includes primary communications circuitry 12, secondary communications circuitry 14, and control circuitry 16. The primary communications circuitry 12 is coupled to a primary antenna 18. The secondary communications circuitry 14 is coupled to a secondary antenna 20. The primary communications circuitry 12 and the secondary communications circuitry 14 are coupled to one another via a first antenna swapping line 22A and a second antenna swapping line 22B. The control circuitry 16 is coupled to both the primary communications circuitry 12 and the secondary communications circuitry 14.

The primary communications circuitry 12 includes antenna swapping circuitry 24 coupled between the primary antenna 18 and primary front end switching circuitry 26 and primary RF filtering circuitry 28 coupled between the primary front end switching circuitry 26, a number of primary RF power amplifiers 30, and a number of primary RF low-noise amplifiers (LNAs) 32.

The secondary communications circuitry 14 includes antenna swapping circuitry 34 coupled between the secondary antenna 20 and secondary front end switching circuitry 36 and secondary RF filtering circuitry 38 coupled between the secondary front end switching circuitry 36 and a number of secondary RF LNAs 40.

The antenna swapping circuitry 24 in the primary communications circuitry 12 and the antenna swapping circuitry 34 in the secondary communications circuitry 14 are configured to couple one of the primary antenna 18 and the secondary antenna 20 to the primary front end switching circuitry 26, and couple the antenna not coupled to the primary front end switching circuitry 26 to the secondary front end switching circuitry 36. The primary front end switching circuitry 26 is configured to couple one or more filters in the primary RF filtering circuitry 28 to the antenna swapping circuitry 24 and thus one of the primary antenna 18 and the secondary antenna 20. The secondary front end switching circuitry 36 is similarly configured to couple one or more filters in the secondary RF filtering circuitry 38 to the antenna swapping circuitry 34 and thus one of the primary antenna 18 and the secondary antenna 20.

The primary RF filtering circuitry 28 is configured to pass primary RF transmit signals within a first operating band between a first one of the primary RF power amplifiers 30A and the primary front end switching circuitry 26 while attenuating other signals in this path, pass primary RF transmit signals within a second operating band between a second one of the primary RF power amplifiers 30B and the primary front end switching circuitry 26 while attenuating other signals in this path, pass primary RF receive signals within the first operating band between the primary front end switching circuitry 26 and a first one of the primary RF LNAs 32A while attenuating other signals in this path, and pass primary RF receive signals within the second operating band between the primary front end switching circuitry 26 and a second one of the primary RF LNAs 32B while attenuating other signals in this path.

The secondary RF filtering circuitry 38 is configured to pass secondary RF receive signals within the first operating band between the secondary front end switching circuitry 36 and a first one of the secondary RF LNAs 40A while attenuating other signals in this path and pass secondary RF receive signals within the second operating band between the secondary front end switching circuitry 36 and a second one of the secondary RF LNAs 40B while attenuating other signals in this path.

Those skilled in the art will appreciate that the conventional RF front end circuitry 10 is suited to perform both uplink carrier aggregation and downlink carrier aggregation. Often, the crux of supporting carrier aggregation configurations is the design of the primary RF filtering circuitry 28. FIG. 2 shows a conventional design for primary RF filtering circuitry 28. Details of the primary front end switching circuitry 26 and the antenna swapping circuitry 24 are shown for reference. The primary RF filtering circuitry 28 may include a quadplexer 42 coupled between a common node 44 and a number of input/output nodes 46. The quadplexer 42 is configured to pass the primary RF transmit signals within the first operating band between the common node 44 and a first one of the input/output nodes 46A while attenuating other signals in this path, pass the primary RF transmit signals within the second operating band between the common node 44 and a second one of the input/output nodes 46B while attenuating other signals in this path, pass the primary RF receive signals within the first operating band between a third one of the input/output nodes 46C and the common node 44 while attenuating other signals in this path, and pass the primary RF receive signals within the second operating band between a fourth one of the input/output nodes 46D and the common node 44 while attenuating other signals in this path.

The primary front end switching circuitry 26 includes a number of primary front end switches SW_PFE configured to selectively couple one or more filters in the primary RF filtering circuitry 28 to the antenna swapping circuitry 24. A first one of the primary front end switches SW_PFE1 is coupled between the common node 44 and the antenna swapping circuitry 24. Additional primary front end switches SW_PFE are shown for reference, and are coupled between additional filters in the primary RF filtering circuitry 28 and the antenna swapping circuitry 24. The additional filters are not relevant to the present discussion and thus not shown.

The antenna swapping circuitry 24 includes a number of antenna swapping switches SW_AS configured to selectively couple the primary front end switching circuitry 26 to one of the primary antenna 18 and the secondary antenna 20. To couple the primary front end switching circuitry 26 to the primary antenna 18, a first one of the antenna swapping switches SW_AS1 is closed, while a second one of the antenna swapping switches SW_AS2 and a third one of the antenna swapping switches SW_AS3 are open. Accordingly, primary RF transmit signals and primary RF receive signals are communicated between the primary front end switching circuitry 26 and the primary antenna 18 via the first one of the antenna swapping switches SW_AS1. To couple the primary front end switching circuitry 26 to the secondary antenna 20, the first one of the antenna swapping switches SW_AS1 is opened, while the second one of the antenna swapping switches SW_AS2 is closed. A the third one of the antenna swapping switches SW_AS3 may be opened or closed, depending on if secondary receiver circuitry (not shown) should be coupled to the primary antenna 18. Accordingly, primary RF transmit signals and primary RF receive signals are communicated between the primary front end switching circuitry 26 and the secondary antenna 20 via the second antenna swapping switch SW_AS2 and the first antenna swapping line 22A. Secondary RF receive signals are communicated between the secondary front end switching circuitry 36 and the primary antenna 18 via the third one of the antenna swapping switches SW_AS3 and the second antenna swapping line 22B.

In an uplink carrier aggregation mode of operation in which the primary RF transmit signals within the first operating band and the primary RF transmit signals within the second operating band are simultaneously provided by the first one of the primary RF power amplifiers 30A and the second one of the primary RF power amplifiers 30B, respectively, these primary RF transmit signals will flow through the first one of the primary front end switches SW_PFE1 to the antenna swapping circuitry 24. If the primary antenna 18 is coupled to the primary front end switching circuitry 26, the primary RF transmit signals will then flow through the first one of the antenna swapping switches SW_AS1 to the primary antenna 18. If the secondary antenna 20 is coupled to the primary front end switching circuitry 26, the primary RF transmit signals will then flow through the second one of the antenna swapping switches SW_AS2 to the secondary antenna 20. Notably, both the primary RF transmit signals within the first operating band and the primary RF transmit signals within the second operating band will flow through these switches.

Those skilled in the art will appreciate that switches exhibit non-linear behavior that is very difficult to eliminate. This non-linear behavior causes intermodulation of RF signals flowing through the switches, leading to intermodulation products such as IMD3 products. In certain combinations of operating bands, this intermodulation may be problematic. For example, when the first operating band is Long Term Evolution (LTE) operating band 1 (with a transmit frequency of 1920-1980 MHz and a receive frequency of 2110-2170 MHz) and the second operating band is LTE operating band 3 (with a transmit frequency of 1710-1785 MHz and a receive frequency of 1805-1880 MHz), intermodulation products between primary RF transmit signals within the first operating band and the second operating band fall directly into the receive frequency of the first operating band. This may cause desensitization of the first one of the primary RF LNAs 32A, and make the primary RF receive signals within the second operating band unusable. Accordingly, the conventional design of the primary RF filtering circuitry 28, the primary front end switching circuitry 26, and the antenna swapping circuitry 24 may make the conventional RF front end circuitry 10 unsuitable for certain uplink carrier aggregation configurations.

In light of the above, there is a need for RF filtering circuitry, front end switching circuitry, and antenna swapping circuitry configured to operate in one or more uplink carrier aggregation configurations with reduced intermodulation and thus improved performance.

SUMMARY

The present disclosure relates to radio frequency (RF) circuitry suitable for carrier aggregation, and specifically to RF circuitry configured to reduce intermodulation products produced during uplink carrier aggregation. In one embodiment, circuitry includes a first switch, a second switch, a first filter, a second filter, and control circuitry. The first switch is coupled between a first filter node and a common node. The second switch is coupled between a second filter node and the common node. The first filter is coupled between a first input/output node and the first filter node and configured to pass RF transmit signals within a first RF frequency band between the first input/output node and the first filter node while attenuating other signals. The second filter is coupled between a second input/output node and the second filter node and configured to pass RF transmit signals within a second RF frequency band between the second input/output node and the second filter node while attenuating other signals. The control circuitry is coupled to the first switch and the second switch and configured to couple the first filter node and the second filter node to the common node in an uplink carrier aggregation configuration. By combining the RF transmit signals within the first RF frequency band and the RF transmit signals within the second RF frequency band after the first switch and the second switch, intermodulation of these signals in the first switch and the second switch is significantly reduced, thereby improving the performance of the circuitry.

In one embodiment, the control circuitry is further configured to couple one of the first filter node and the second filter node to the common node in a non-uplink carrier aggregation configuration.

In one embodiment, the first filter is configured to present a high impedance to the first filter node for signals within the second RF frequency band, and the second filter is configured to present a high impedance to the second filter node for signals within the first RF frequency band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
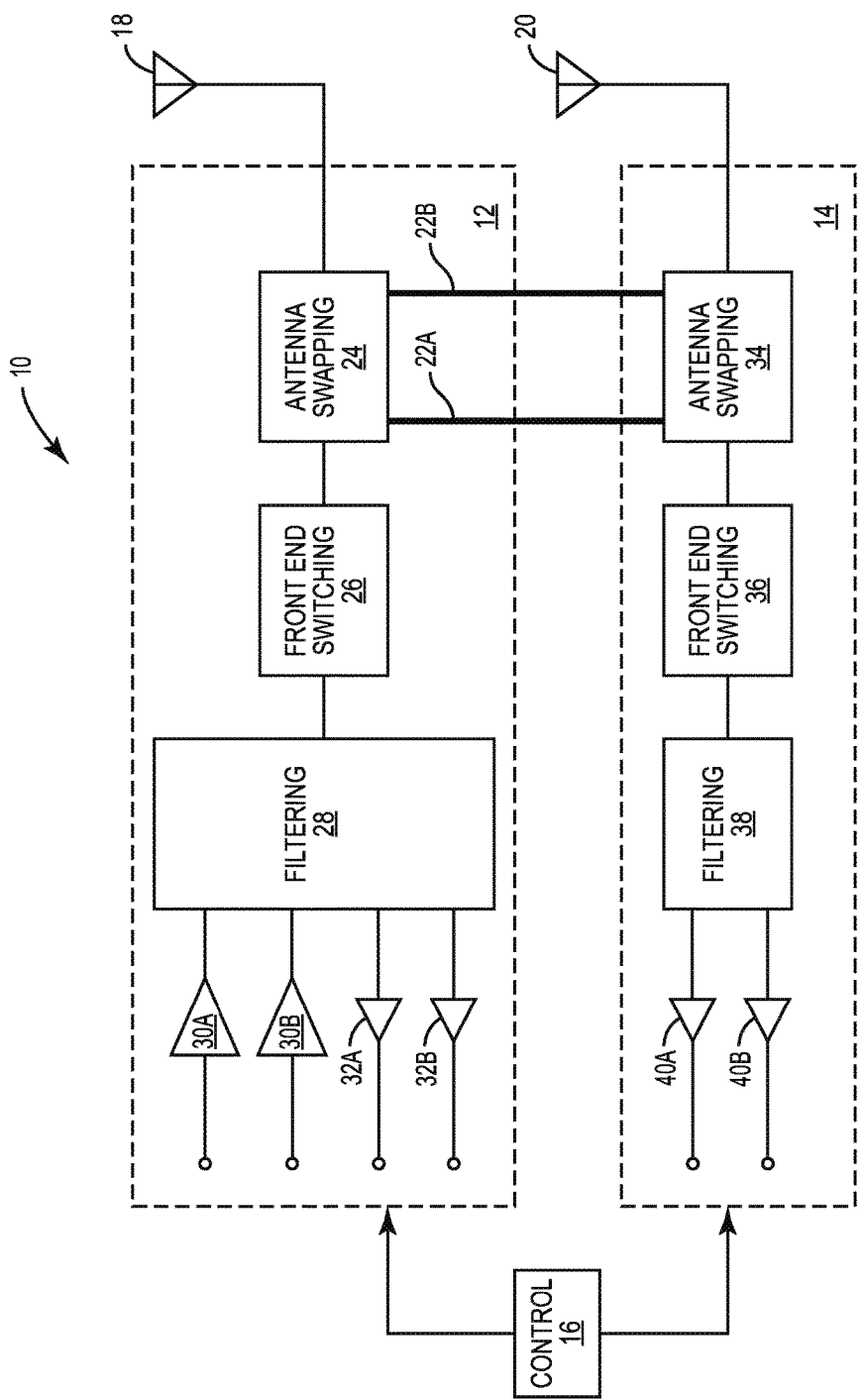
FIG. 1 is a functional schematic of conventional radio frequency (RF) front end circuitry.
Figure 2:
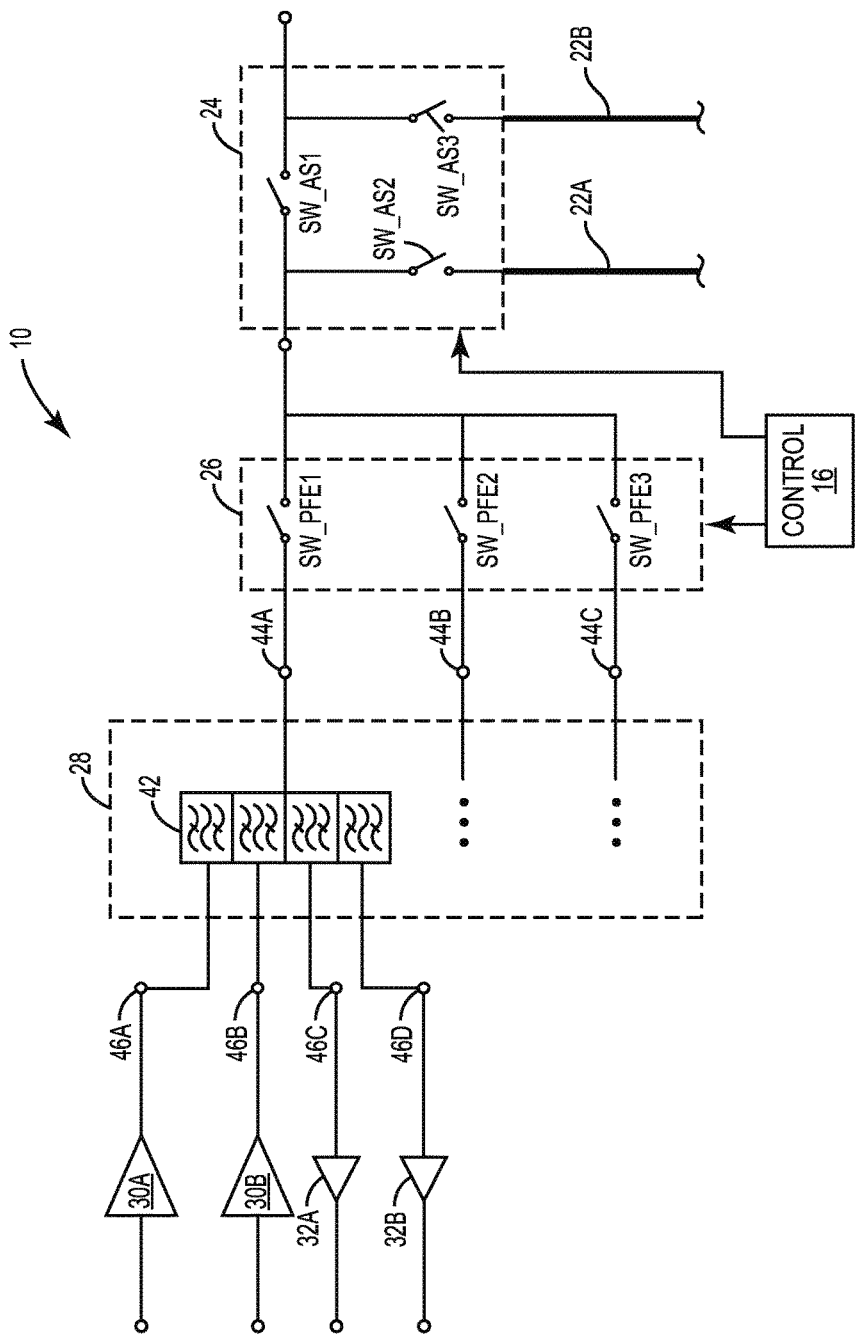
FIG. 2 is a functional schematic showing details of conventional RF front end circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
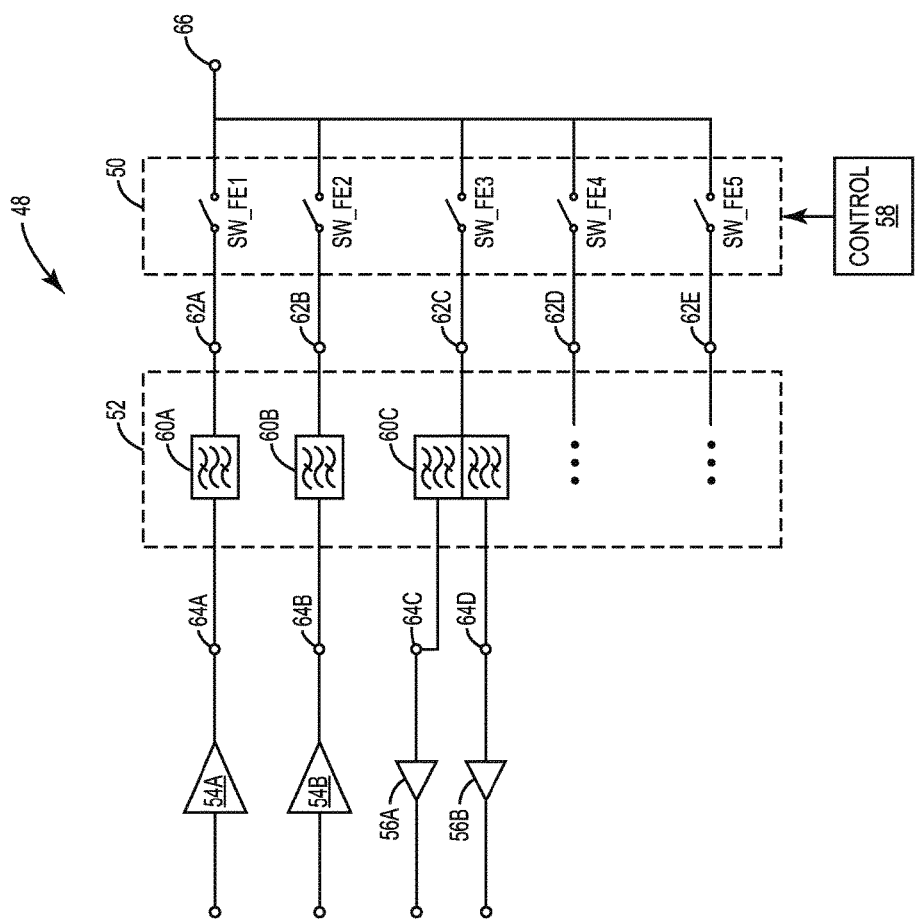
FIG. 3 is a functional schematic of RF circuitry according to one embodiment of the present disclosure.

FIG. 3 shows radio frequency (RF) circuitry 48 according to one embodiment of the present disclosure. The RF circuitry 48 includes front end switching circuitry 50, RF filtering circuitry 52, a number of RF power amplifiers 54, and a number of RF low-noise amplifiers (LNAs) 56. Control circuitry 58 is coupled to the front end switching circuitry 50. The RF filtering circuitry 52 includes a first filter 60A coupled between a first filter node 62A and a first input/output node 64A, a second filter 60B coupled between a second filter node 62B and a second input/output node 64B, and a third filter 60C coupled between a third filter node 62C, a third input/output node 64C, and a fourth input/output node 64D. A first front end switch SW_FE1 in the front end switching circuitry 50 is coupled between the first filter node 62A and a common node 66. A second front end switch SW_FE2 in the front end switching circuitry 50 is coupled between the second filter node 62B and the common node 66. A third front end switch SW_FE3 is coupled between the third filter node 62C and the common node 66. Additional front end switches SW_FE in the front end switching circuitry 50 are shown, and may be coupled between various other filters in the RF filtering circuitry 52 that are also not shown to avoid obscuring the drawings. Those skilled in the art will appreciate that the RF filtering circuitry 52 may include any number of different filters suitable for supporting any desired combination of operating bands, and that the front end switching circuitry 50 may contain any number of front end switches SW_FE for supporting these additional filters.

The first filter 60A may be a transmit signal filter configured to pass primary RF transmit signals within a first operating band between the first input/output node 64A and the first filter node 62A while attenuating other signals in this path. The second filter 60B may be a transmit signal filter configured to pass primary RF transmit signals within a second operating band between the second input/output node 64B and the second filter node 62B while attenuating other signals in this path. The third filter 60C may be a diplexer configured to pass primary RF receive signals within the first operating band between the third filter node 62C and the third input/output node 64C while attenuating other signals in this path and pass primary RF receive signals within the second operating band between the third filter node 62C and the fourth input/output node 64D while attenuating other signals in this path.

A first RF power amplifier 54A is coupled to the first input/output node 64A. The first RF power amplifier 54A may be configured to receive and amplify the primary RF transmit signals within the first operating band and provide them to the first input/output node 64A. A second RF power amplifier 54B is coupled to the second input/output node 64B. The second RF power amplifier 54B may be configured to receive and amplify the primary RF transmit signals within the second operating band and provide them to the second input/output node 64B. A first RF LNA 56A is coupled to the third input/output node 64C. The first RF LNA 56A may be configured to receive and amplify the primary RF receive signals within the first operating band and provide them to downstream circuitry for further processing. A second RF LNA 56B is coupled to the fourth input/output node 64D. The second RF LNA 56B may be configured to receive and amplify the primary RF receive signals within the second operating band and provide them to downstream circuitry for further processing.

The control circuitry 58 may be configured to provide control signals to each one of the front end switches SW_FE in the front end switching circuitry 50 in order to control the state thereof. In a carrier uplink configuration in which the primary RF transmit signals within the first operating band and the primary RF transmit signals within the second operating band are simultaneously provided, the control circuitry 58 may close the first one of the front end switches SW_FE1 and the second one of the front end switches SW_FE2 to couple the first filter node 62A and the second filter node 62B to the common node 66. The third one of the front end switches SW_FE3 may also be closed to couple the third filter 60C to the common node 66 to simultaneously receive signals within the first operating band and the second operating band. In such a configuration, the primary RF transmit signals within the first operating band and the primary RF transmit signals within the second operating band are combined at the common node 66, which is upstream of the front end switches SW_FE. Those skilled in the art will appreciate that for intermodulation to occur, two signals must pass together through a non-linear element such as a switch. Since the primary RF transmit signals within the first operating band and the primary RF transmit signals within the second operating band are separately provided through the first one of the front end switches SW_FE1 and the second one of the front end switches SW_FE2, the third-order intermodulation distortion that would otherwise be provided if the combination of these signals were provided through the same closed switch is significantly reduced.

To prevent the primary RF transmit signals within the first operating band from flowing backwards from the common node 66 to the second filter node 62B, the second filter 60B may be designed to present a high impedance to the second filter node 62B for signals within the first operating band. Similarly, to prevent the primary RF transmit signals within the second operating band from flowing backwards from the common node 66 to the first filter node 62A, the first filter 60A may be designed to present a high impedance to the first filter node 62A for signals within the second operating band. Those skilled in the art will appreciate the design criteria of filters configured to provide such an impedance response.

By separating the signal paths of the primary RF transmit signals within the first operating band and the primary RF transmit signals within the second operating band through the front end switching circuitry 50, these signals may remain separated through highly non-linear elements in the signal path such as switches. Accordingly, intermodulation between these signals is reduced, thereby preventing intermodulation products from desensitizing downstream receiver circuitry as discussed above. Such an approach may be highly advantageous when intermodulation products from the primary RF transmit signals within the first operating band and the primary RF transmit signals within the second operating band fall within a receive band of one of the operating bands. For example, the foregoing approach may provide benefits when the first operating band is Long Term Evolution (LTE) operating band 1 and the second operating band is LTE operating band 3 for the reasons discussed above. Those skilled in the art will appreciate that the principles of the present disclosure may benefit other combinations of operating bands as well, all of which are contemplated herein.

Notably, the arrangement of the first filter 60A, the second filter 60B, the third filter 60C, and the front end switches SW_FE in the front end switching circuitry 50 are merely exemplary. Those skilled in the art will appreciate that many suitable filter and switch arrangements may accomplish the same purpose, all of which are contemplated herein. In general, the present disclosure encompasses arrangements of filters and switches that avoid passing primary RF transmit signals within problematic operating band combinations (e.g., LTE operating band 1 and LTE operating band 3) through non-linear elements such as switches in order to reduce intermodulation.

The first filter 60A, the second filter 60B, and the third filter 60C may be any suitable type of filters. For example, the first filter 60A, the second filter 60B, and the third filter 60C may be acoustic filters such as surface acoustic wave (SAW) filters, bulk acoustic wave (BAW) filters, and the like. In some embodiments, the RF circuitry 48 is used in primary communications circuitry such as that shown in FIG. 1, such that the common node 66 is coupled to a primary antenna through antenna swapping circuitry. The secondary communications circuitry associated therewith may remain relatively unchanged while still providing the benefits described above.

Figure 4:
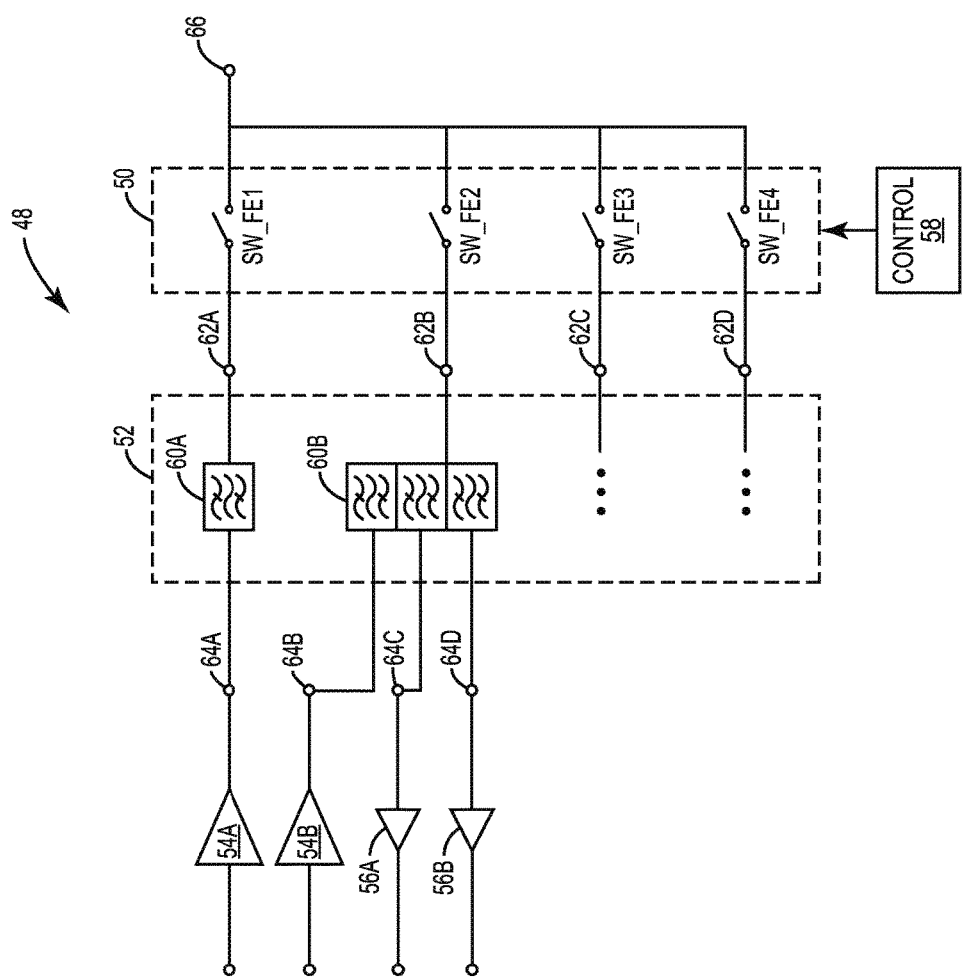
FIG. 4 is a functional schematic of RF circuitry according to one embodiment of the present disclosure.

FIG. 4 shows the RF circuitry 48 according to an additional embodiment of the present disclosure. The RF circuitry 48 shown in FIG. 4 is substantially similar to that shown in FIG. 3, except that the second filter 60B is combined with the third filter 60C to form a triplexer (as opposed to the single transmit filter and diplexer shown in FIG. 3). The combined second filter 60B and third filter 60C (referred to herein as the second filter 60B), is configured to pass the primary RF transmit signals within the second operating band between the second input/output node 64B and the second filter node 62B while attenuating other signals in this path, pass the primary RF receive signals within the first operating band between the second filter node 62B and the third input/output node 64C while attenuating other signals in this path, and pass the primary RF receive signals within the second operating band between the second filter node 62B and the fourth input/output node 64D while attenuating other signals in this path. The operation of the RF circuitry 48 is unchanged. FIG. 4 merely illustrates that the filters 60 in the RF filtering circuitry 52 may be grouped in any suitable manner so long as the primary RF transmit signals within the first operating band are separated from the primary RF transmit signals within the second operating band through the front end switching circuitry 50, thereby avoiding the combination of these signals through non-linear elements such as the front end switches SW_FE in order to reduce intermodulation. As discussed above, the first filter 60A is configured to present a high impedance at the first filter node 62A for signals within the second operating band while the second filter 60B is configured to present a high impedance at the second filter node 62B for signals within the first operating band in order to avoid reverse leakage of these signals. Those skilled in the art will appreciate that combining certain filters 60 in the RF filtering circuitry 52 may provide performance benefits in the filters.

Figure 5:
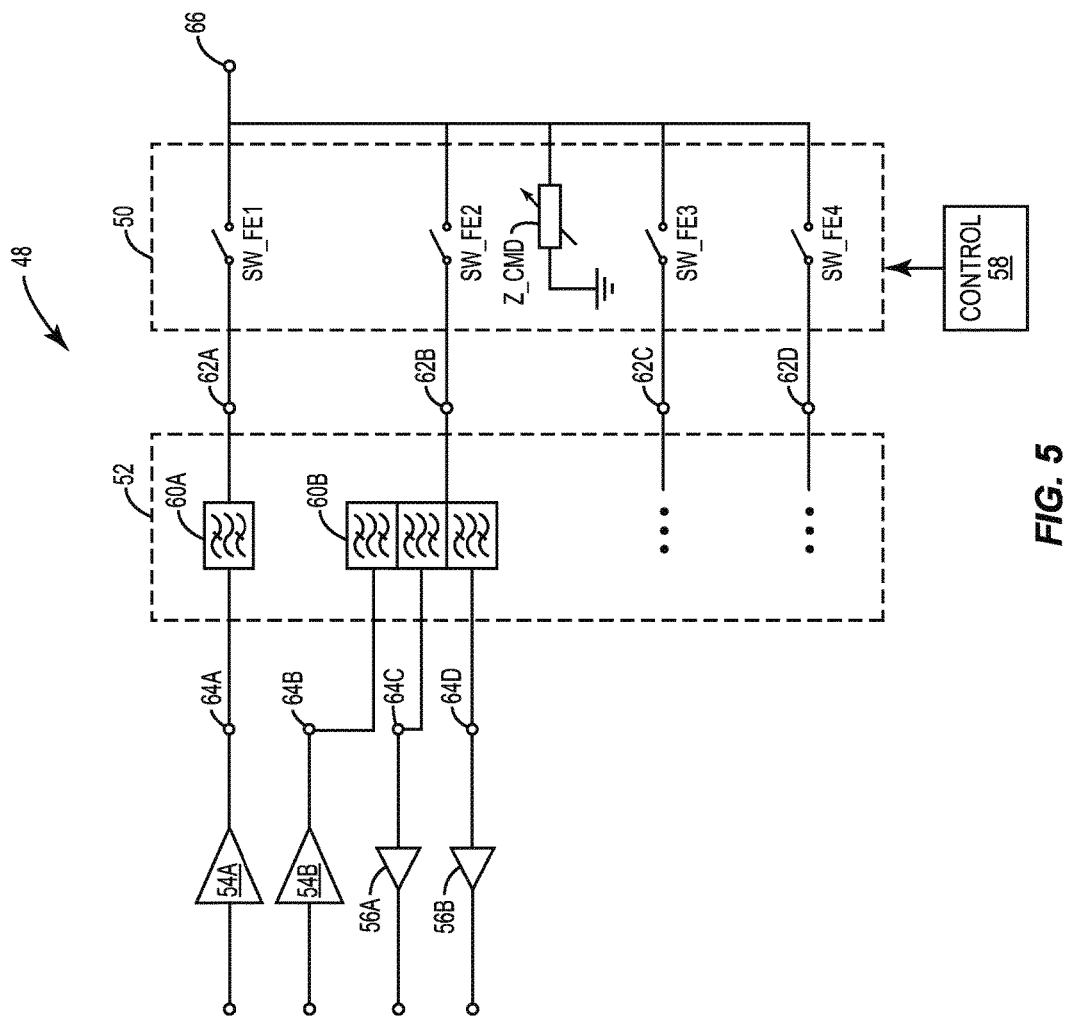
FIG. 5 is a functional schematic of RF circuitry according to one embodiment of the present disclosure.

As discussed above, additional filters (not shown) may be included in the RF filtering circuitry 52 and coupled to front end switches SW_FE in the front end switching circuitry 50. These additional filters may be selectively coupled to the common node 66 to support the transmission or reception of RF signals within various operating bands. When not used, the front end switches SW_FE coupled to these additional filters are opened to disconnect them from the common node 66. These open front end switches SW_FE may present undesirable impedances to the common node 66, which may be non-linear and cause undesirable effects. Accordingly, FIG. 5 shows the RF circuitry 48 according to one embodiment of the present disclosure. The RF circuitry 48 shown in FIG. 5 is substantially similar to that shown in FIG. 4, but further includes a compensator impedance Z_CMP coupled between the common node 66 and ground. The compensator impedance Z_CMP may be an adjustable impedance operated by the control circuitry 58 to reduce the impact of the open front end switches SW_FE on the operation of the RF circuitry 48. The compensator impedance Z_CMP may be an adjustable capacitor, inductor, resistor, or some combination thereof, and may provide an impedance that is opposite to that presented by the open front end switches SW_FE in order to reduce the effect of these switches on the primary RF transmit signals within the first operating band and the primary RF transmit signals within the second operating band at the common node 66.

Figure 6:
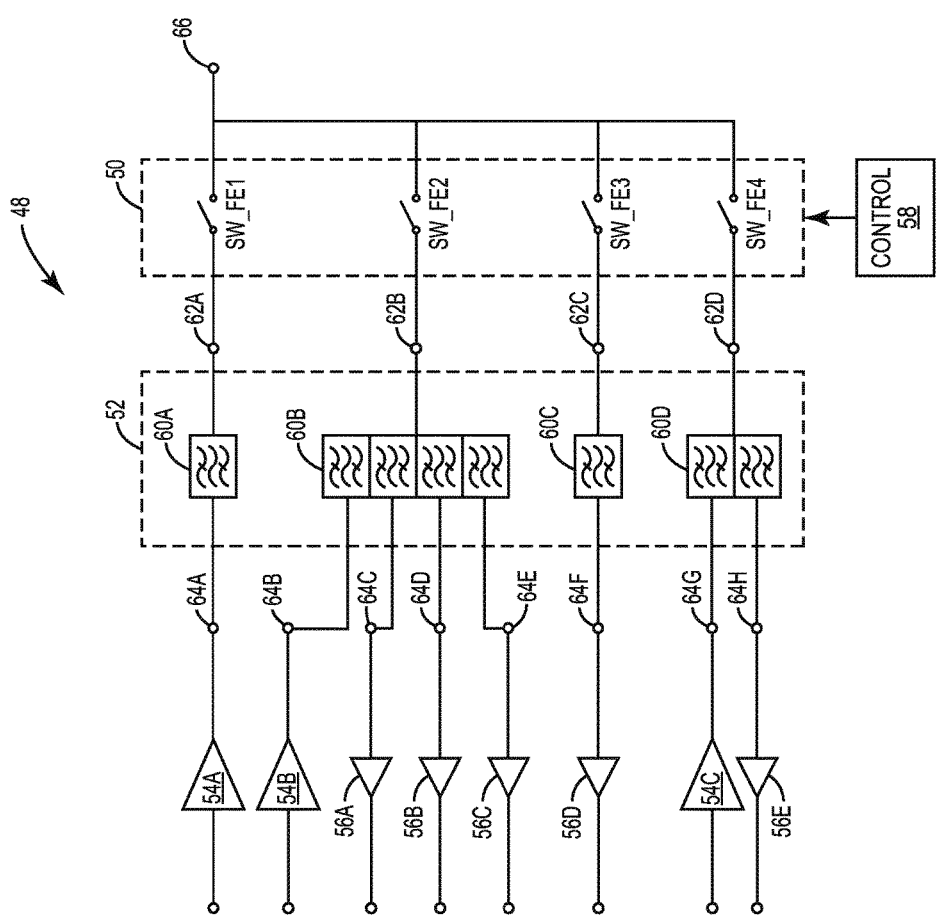
FIG. 6 is a functional schematic of RF circuitry according to one embodiment of the present disclosure.

FIG. 6 shows the RF circuitry 48 with the additional filters discussed above. Specifically, FIG. 6 shows the RF circuitry 48 in which the first filter 60A is a transmit signal filter coupled between the first filter node 62A and the first input/output node 64A, and is configured to pass the primary RF transmit signals within the first operating band between the first input/output node 64A and the first filter node 62A while attenuating other signals in this path. The second filter 60B is a quadplexer coupled between the second filter node 62B, the second input/output node 64B, the third input/output node 64C, the fourth input/output node 64D, and a fifth input/output node 64E, and is configured to pass the primary RF transmit signals within the second operating band between the second input/output node 64B and the second filter node 62B while attenuating other signals in this path, pass the primary RF receive signals within the first operating band between the second filter node 62B and the third input/output node 64C while attenuating other signals in this path, pass the primary RF receive signals within the second operating band between the second filter node 62B and the fourth input/output node 64D while attenuating other signals in this path, and pass primary RF receive signals within a third operating band between the second filter node 62B and the fifth input/output node 64E while attenuating other signals in this path.

The third filter 60C is a receive signal filter coupled between the third filter node 62C and a sixth input/output node 64F, and is configured to pass primary RF receive signals within a fourth operating band between the third filter node 62C and the sixth input/output node 64F while attenuating other signals in this path. A fourth filter 60D is a diplexer coupled between a fourth filter node 62D, a seventh input/output node 64G, and an eighth input/output node 64H, and is configured to pass primary RF transmit signals within a fifth operating band between the seventh input/output node 64G and the fourth filter node 62D while attenuating other signals in this path and pass primary RF receive signals within the fifth operating band between the fourth filter node 62D and the eighth input/output node 64H while attenuating other signals in this path.

The first RF power amplifier 54A, the second RF power amplifier 54B, the first RF LNA 56A, and the second RF LNA 56B are configured to operate as described above. A third RF LNA 56C coupled to the fifth input/output node 64E is configured to receive and amplify primary RF receive signals within the third operating band, a fourth RF LNA 56D coupled to the sixth input/output node 64F is configured to receive and amplify primary RF receive signals within the fourth operating band, a fifth RF LNA 56E coupled to the eighth input/output node 64H is configured to receive and amplify primary RF receive signals within the fifth operating band. A third RF power amplifier 54C is configured to receive and amplify primary RF receive signals within the fifth operating band.

The RF circuitry 48 operates substantially similar to that described above. FIG. 6 merely illustrates that additional filters 60 may be provided in the RF filtering circuitry 52 to support additional operating bands, and may be grouped in any suitable manner so long as primary RF transmit signals in problematic operating band combinations remain separated through non-linear components such as the front end switches SW_FE in the front end switching circuitry 50.

Figure 7:
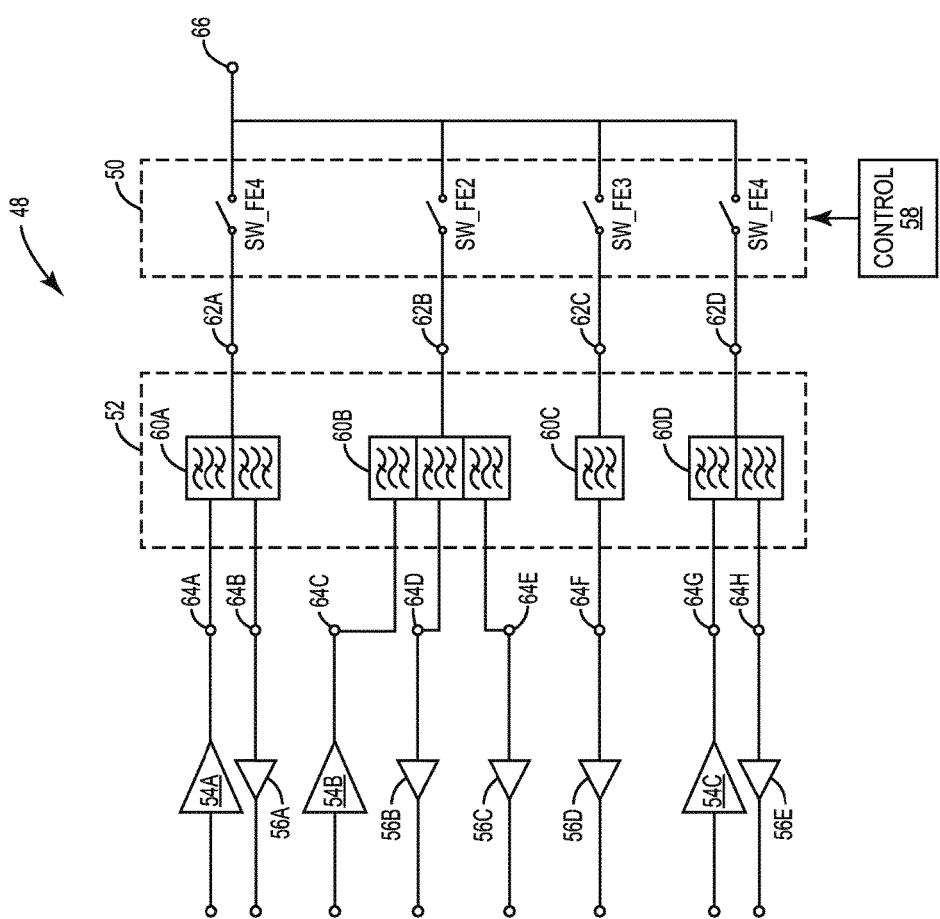
FIG. 7 is a functional schematic of RF circuitry according to one embodiment of the present disclosure.

FIG. 7 shows the RF circuitry 48 according to yet another embodiment of the present disclosure. The RF circuitry 48 shown in FIG. 7 is substantially similar to that shown in FIG. 6 except that the first filter 60A is a diplexer and the second filter 60B is a triplexer. Accordingly, the first filter 60A is coupled between the first filter node 62A, the first input/output node 64A, and the second input/output node 64B and the second filter 60B is coupled between the second filter node 62B, the third input/output node 64C, the fourth input/output node 64D, and the fifth input/output node 64E. The first filter 60A is configured to pass the primary RF transmit signals within the first operating band between the first input/output node 64A and the first filter node 62A while attenuating other signals in this path and pass the primary RF receive signals within the first operating band between the first filter node 62A and the second input/output node 64B while attenuating other signals in this path. The second filter 60B is configured to pass the primary RF transmit signals within the second operating band between the third input/output node 64C and the second filter node 62B while attenuating other signals in this path, pass the primary RF receive signals within the second operating band between the second filter node 62B and the fourth input/output node 64D while attenuating other signals in this path, and pass the primary RF receive signals within the third operating band between the second filter node 62B and the fifth input/output node 64E while attenuating other signals in this path.

The first RF power amplifier 54A is coupled to the first input/output node 64A, the first RF LNA 56A is coupled to the second input/output node 64B, the second RF power amplifier 54B is coupled to the third input/output node 64C, the second RF LNA 56B is coupled to the fourth input/output node 64D, and the third RF LNA 56C is coupled to the fifth input/output node 64E. The remaining RF power amplifiers 54 and RF LNAs 56 are coupled as described above with respect to FIG. 6 and operated as described above. FIG. 7 once again illustrates that the filters 60 in the RF filtering circuitry 52 may be provided in any number of different ways without departing from the principles of the present disclosure.

Figure 8:
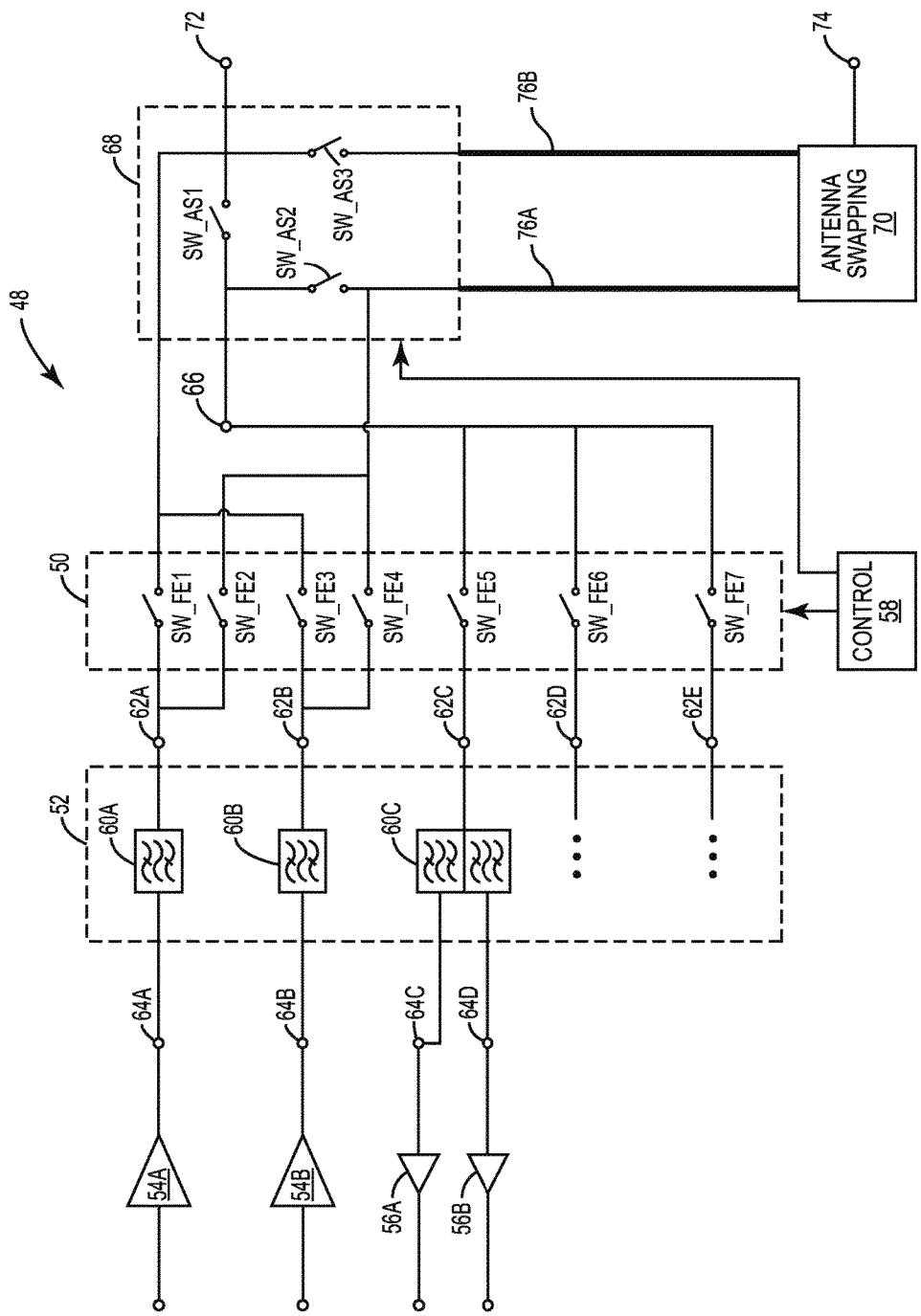
FIG. 8 is a functional schematic of RF circuitry according to one embodiment of the present disclosure.

As discussed above, intermodulation may occur when two RF signals pass through a substantially non-linear element such as a switch. Accordingly, intermodulation between the primary RF transmit signals within the first operating band and the primary RF transmit signals within the second operating band may occur not only in the front end switching circuitry 50 but also in antenna swapping circuitry upstream of the front end switching circuitry 50. FIG. 8 thus shows the RF circuitry 48 further including antenna swapping circuitry 68 configured to reduce intermodulation. The RF circuitry 48 shown in FIG. 8 is substantially similar to that shown in FIG. 3, but further includes antenna swapping circuitry 68 coupled to the front end switching circuitry 50. Secondary antenna swapping circuitry 70 is also shown for reference. As will be appreciated by those skilled in the art, the secondary antenna swapping circuitry 70 will be provided in secondary communications circuitry, such as that described above with respect to FIG. 1.

The front end switches SW_FE in the front end switching circuitry 50 are arranged to reduce intermodulation. Specifically, a first one of the front end switches SW_FE1 is coupled between the first filter node 62A and a primary antenna node 72, a second one of the front end switches SW_FE2 is coupled between the first filter node 62A and a secondary antenna node 74 (through the secondary antenna swapping circuitry 70), a third one of the front end switches SW_FE3 is coupled between the second filter node 62B and the primary antenna node 72, a fourth one of the front end switches SW_FE4 is coupled between the second filter node 62B and the secondary antenna node 74 (through the secondary antenna swapping circuitry 70), a fifth one of the front end switches SW_FE5 is coupled between the third filter node 62C and the common node 66, a sixth one of the front end switches SW_FE6 is coupled between the fourth filter node 62D and the common node 66, and a seventh one of the front end switches FE_SW7 is coupled between the fifth filter node 62E and the common node 66. A first antenna swapping switch SW_AS1 is coupled between the common node 66 and the primary antenna node 72. A second antenna swapping switch SW_AS2 is coupled between the common node 66 and the secondary antenna node 74 (through the secondary antenna swapping circuitry 70). A third antenna swapping switch SW_AS3 is coupled between the primary antenna node 72 and the secondary antenna swapping circuitry 70.

The control circuitry 58 may operate the front end switches SW_FE and the antenna swapping switches SW_AS such that in a first mode of operation the first one of the front end switches SW_FE1 and the third one of the front end switches SW_FE3 are closed. Accordingly, the primary RF transmit signals within the first operating band and the primary RF transmit signals within the second operating band are separately provided through the first one of the front end switches SW_FE1 and the third one of the front end switches SW_FE3 and combined at the primary antenna node 72, where they may be simultaneously transmitted from a primary antenna connected thereto. The first antenna swapping switch SW_AS1 and the fifth one of the front end switches SW_FE5 may also be closed in order to provide primary RF receive signals from the primary antenna node 72 to the third filter 60C. Notably, in this configuration the primary RF transmit signals within the first operating band and the primary RF transmit signals within the second operating band are not provided together through a non-linear element such as a switch, thereby reducing intermodulation.

In a second mode of operation the second one of the front end switches SW_FE2 and the fourth one of the front end switches SW_FE4 may be closed. Accordingly, the primary RF transmit signals within the first operating band and the primary RF transmit signals within the second operating band are separately provided through the second one of the front end switches SW_FE2 and the fourth one of the front end switches SW_FE4 and combined at the secondary antenna node 74 (at a first antenna swapping line 76A before the secondary antenna swapping circuitry 70). While the primary RF transmit signals within the first operating band and the primary RF transmit signals within the second operating band may flow together though one or more switches in the secondary antenna swapping circuitry 70 to reach the secondary antenna node 74, the number of non-linear elements in the signal path thereof is still minimized, resulting in reduced intermodulation. Since providing the primary RF transmit signals from a secondary antenna coupled to the secondary antenna node 74 only occurs in poor signal conditions of a primary antenna coupled to the primary antenna node 72, this intermodulation may not be problematic. Secondary RF receive signals within the first operating band and secondary RF receive signals within the second operating band may be provided from the primary antenna node 72 to secondary communications circuitry via a second antenna swapping line 76B and the secondary antenna swapping circuitry 70.

Those skilled in the art will recognize improvements and modifications to the preferred embodiments of the present disclosure. All such improvements and modifications are considered within the scope of the concepts disclosed herein and the claims that follow.

What is claimed is:

1. Circuitry comprising:
   a first switch coupled between a first filter node and a common node;
   a second switch coupled between a second filter node and the common node;
   a third switch coupled between a third filter node and the common node;
   a first filter coupled between a first input/output node and the first filter node and configured to pass RF transmit signals within a first RF frequency band between the first input/output node and the first filter node while attenuating other signals;
   a second filter coupled between a second input/output node and the second filter node and configured to pass RF transmit signals within a second RF frequency band between the second input/output node and the second filter node while attenuating other signals;
   a third filter coupled between a third input/output node, a fourth input/output node, and the third filter node and configured to pass RF receive signals within the first RF frequency band between the third filter node and the third input/output node while attenuating other signals and pass RF receive signals within the second RF frequency band between the third filter node and the fourth input/output node while attenuating other signals; and
   control circuitry coupled to the first switch, the second switch, and the third switch and configured to:
   close the first switch and the second switch concurrently to couple the first filter node and the second filter node to the common node, respectively, in an uplink carrier aggregation configuration such that the RF transmit signals within the first RF frequency band and the RF transmit signals within the second RF frequency band are simultaneously and separately passed through the first switch and the second switch, respectively, and are combined at the common node to be transmitted simultaneously and
close the third switch concurrent to closing the first switch and the second switch to couple the third filter node to the common node such that the RF receive signals within the first RF frequency band and the RF receive signals within the second RF frequency band are simultaneously passed through the third switch concurrent to the RF transmit signals within the first RF frequency band and the RF transmit signals within the second RF frequency band being simultaneously and separately passed through the first switch and the second switch, respectively.

2. The circuitry of claim 1 wherein the control circuitry is further configured to couple one of the first filter node and the second filter node to the common node in a non-uplink carrier aggregation configuration.

3. The circuitry of claim 2 wherein the first filter is configured to present a high impedance to the first filter node for signals within the second RF frequency band.

4. The circuitry of claim 3 wherein the second filter is configured to present a high impedance to the second filter node for signals within the first RF frequency band.

5. The circuitry of claim 1 wherein the first filter is configured to present a high impedance to the first filter node for signals within the second RF frequency band.

6. The circuitry of claim 5 wherein the second filter is configured to present a high impedance to the second filter node for signals within the first RF frequency band.

7. The circuitry of claim 1 wherein:
the first filter is one of a bulk acoustic wave (BAW) filter and a surface acoustic wave (SAW) filter; and
the second filter is one of a BAW filter and a SAW filter.

8. Circuitry comprising:
a first switch coupled between a first filter node and a common node;
a second switch coupled between a second filter node and the common node;
a third switch coupled between a third filter node and the common node;
a first filter coupled between a first input/output node, a second input/output node, and the first filter node and configured to pass RF transmit signals within a first RF frequency band between the first input/output node and the first filter node while attenuating other signals and pass RF receive signals within the first RF frequency band between the first filter node and the second input/output node while attenuating other signals;
a second filter coupled between a third input/output node, a fourth input/output node, and the second filter node and configured to pass RF transmit signals within a second RF frequency band between the second input/output node and the second filter node while attenuating other signals and pass RF receive signals within the second RF frequency band between the second filter node and the fourth input/output node while attenuating other signals;
a third filter configured to pass RF receive signals within the first RF frequency band while attenuating other signals and pass RF receive signals within the second RF frequency band while attenuating other signals; and
control circuitry coupled to the first switch, the second switch, and the third switch and configured to:
close the first switch and the second switch concurrently to couple the first filter node and the second filter node to the common node in an uplink carrier aggregation configuration such that the RF transmit signals within the first RF frequency band and the RF transmit signals within the second RF frequency band are simultaneously and separately passed through the first switch and the second switch, respectively, and are combined at the common node to be transmitted simultaneously; and
close the third switch concurrent to closing the first switch and the second switch to couple the third filter node to the common node such that the RF receive signals within the first RF frequency band and the RF receive signals within the second RF frequency band are simultaneously passed through the third switch concurrent to the RF transmit signals within the first RF frequency band and the RF transmit signals within the second RF frequency band being simultaneously and separately passed through the first switch and the second switch, respectively.

9. The circuitry of claim 8 wherein the control circuitry is further configured to couple one of the first filter node and the second filter node to the common node in a non-uplink carrier aggregation configuration.

10. The circuitry of claim 9 wherein the first filter is configured to present a high impedance to the first filter node for signals within the second RF frequency band.

11. The circuitry of claim 10 wherein the second filter is configured to present a high impedance to the second filter node for signals within the first RF frequency band.

12. The circuitry of claim 8 wherein the first filter is configured to present a high impedance to the first filter node for signals within the second RF frequency band.

13. The circuitry of claim 12 wherein the second filter is configured to present a high impedance to the second filter node for signals within the first RF frequency band.

14. The circuitry of claim 8 wherein:
the first filter is one of a bulk acoustic wave (BAW) filter and a surface acoustic wave (SAW) filter; and
the second filter is one of a BAW filter and a SAW filter.

15. Circuitry comprising:
a primary antenna node configured to be coupled to a primary antenna;
a secondary antenna node configured to be coupled to a secondary antenna;
a first switch coupled between a first filter node and the primary antenna node;
a second switch coupled between the first filter node and the secondary antenna node;
a third switch coupled between a second filter node and the primary antenna node;
a fourth switch coupled between the second filter node and the secondary antenna node;
a fifth switch coupled between a third filter node and a common node;
a first filter coupled between a first input/output node and the first filter node and configured to pass RF transmit signals within a first RF frequency band between the first input/output node and the first filter node while attenuating other signals;
a second filter coupled between a second input/output node and the second filter node and configured to pass RF transmit signals within a second RF frequency band between the second input/output node and the second filter node while attenuating other signals;
a third filter coupled between a third input/output node, a fourth input/output node, and the third filter node and configured to pass RF receive signals within the first RF frequency band between the third filter node and the third input/output node while attenuating other signals and pass RF receive signals within the second RF frequency band between the third filter node and the fourth input/output node while attenuating other signals; and control circuitry coupled to the first switch, the second switch, the third switch, the fourth switch, and the fifth switch and configured to:

close the first switch and the third switch concurrently to couple the first filter node and the second filter node to the primary antenna node in a first uplink carrier aggregation configuration such that the RF transmit signals within the first RF frequency band and the RF transmit signals within the second RF frequency band are simultaneously and separately passed through different ones of the first switch, the second switch, the third switch, and the fourth switch to be combined at the primary antenna node and transmitted simultaneously; and close the fifth switch concurrent to closing the first switch and the third switch to couple the third filter node to the common node such that the RF receive signals within the first RF frequency band and the RF receive signals within the second RF frequency band are simultaneously passed through the third switch concurrent to the RF transmit signals within the first RF frequency band and the RF transmit signals within the second RF frequency band being simultaneously and separately passed through the first switch and the second switch, respectively.

16. The circuitry of claim 15 wherein the control circuitry is further configured to couple the first filter node and the second filter node to the secondary antenna node in a second uplink carrier aggregation configuration.

17. The circuitry of claim 16 wherein the control circuitry is further configured to:

couple one of the first filter node and the second filter node to the primary antenna node in a first non-uplink carrier aggregation configuration; and couple one of the first filter node and the second filter node to the secondary antenna node in a second non-uplink carrier aggregation configuration.

* * * * *